(12) United States Patent
Huber et al.

(10) Patent No.: US 8,342,448 B2
(45) Date of Patent: Jan. 1, 2013

(54) FLOOR MODULE OF A CARGO DECK IN THE HULL OF AN AIRCRAFT

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 331 days.

(21) Appl. No.: 12/721,470

(22) Filed: Mar. 10, 2010

(65) Prior Publication Data
US 2010/0230537 A1 Sep. 16, 2010

(30) Foreign Application Priority Data
Mar. 10, 2009 (DE) .................. 10 2009 012 429

(51) Int. Cl.
*B64C 1/18* (2006.01)
(52) U.S. Cl. .................... 244/118.1; 244/117 R
(58) Field of Classification Search ............... 244/118.1, 244/118.2, 117 R, 119
See application file for complete search history.

(56) References Cited

U.S. PATENT DOCUMENTS

| | | | | | |
|---|---|---|---|---|---|
| 3,339,326 | A | * | 9/1967 | Derr et al. | 52/309.11 |
| 4,860,973 | A | * | 8/1989 | Fenner | 244/137.1 |
| 4,875,645 | A | * | 10/1989 | Courter | 244/137.1 |
| 6,302,358 | B1 | * | 10/2001 | Emsters et al. | 244/137.1 |
| 7,954,760 | B2 | * | 6/2011 | Griess et al. | 244/118.1 |
| 2002/0148382 | A1 | | 10/2002 | Norton et al. | |
| 2006/0060705 | A1 | | 3/2006 | Stulc et al. | |
| 2007/0181745 | A1 | * | 8/2007 | Huber | 244/118.1 |
| 2009/0320398 | A1 | * | 12/2009 | Gouvea | 52/309.1 |
| 2010/0102169 | A1 | * | 4/2010 | Zorzetto et al. | 244/119 |
| 2010/0102171 | A1 | * | 4/2010 | Osorio et al. | 244/129.1 |
| 2010/0133382 | A1 | * | 6/2010 | Pahl | 244/120 |
| 2011/0011978 | A1 | * | 1/2011 | Haack et al. | 244/119 |

FOREIGN PATENT DOCUMENTS

| | | |
|---|---|---|
| DE | 10 2007 011 619 A1 | 7/2008 |
| EP | 1 646 556 B1 | 4/2006 |
| EP | 1 646 557 B1 | 4/2006 |
| WO | 2005012083 A1 | 2/2005 |
| WO | 2008157075 A1 | 12/2008 |

OTHER PUBLICATIONS

European Search Report (ESR) for related foreign application No. EP 10155897.1.

* cited by examiner

*Primary Examiner* — Philip J Bonzell
*Assistant Examiner* — Timothy Schwarz
(74) *Attorney, Agent, or Firm* — Barnes & Thornburg LLP

(57) ABSTRACT

Floor modules of a cargo deck in a hull of an aircraft which comprise support devices for carrying functional elements, e.g. panels, roller conveyors or ball mats, are provided. The support devices are attachable in the hull of the aircraft directly or by way of intermediate elements. To improve stability at reduced weight, end support devices, as seen in the aircraft's longitudinal direction, have a thickness reduced in such a way compared to the other support devices of the floor module that only together with the end support devices of a floor module installed adjacently in the hull do they ensure a loading capacity that corresponds to at least the loading capacity of the other support devices.

5 Claims, 2 Drawing Sheets

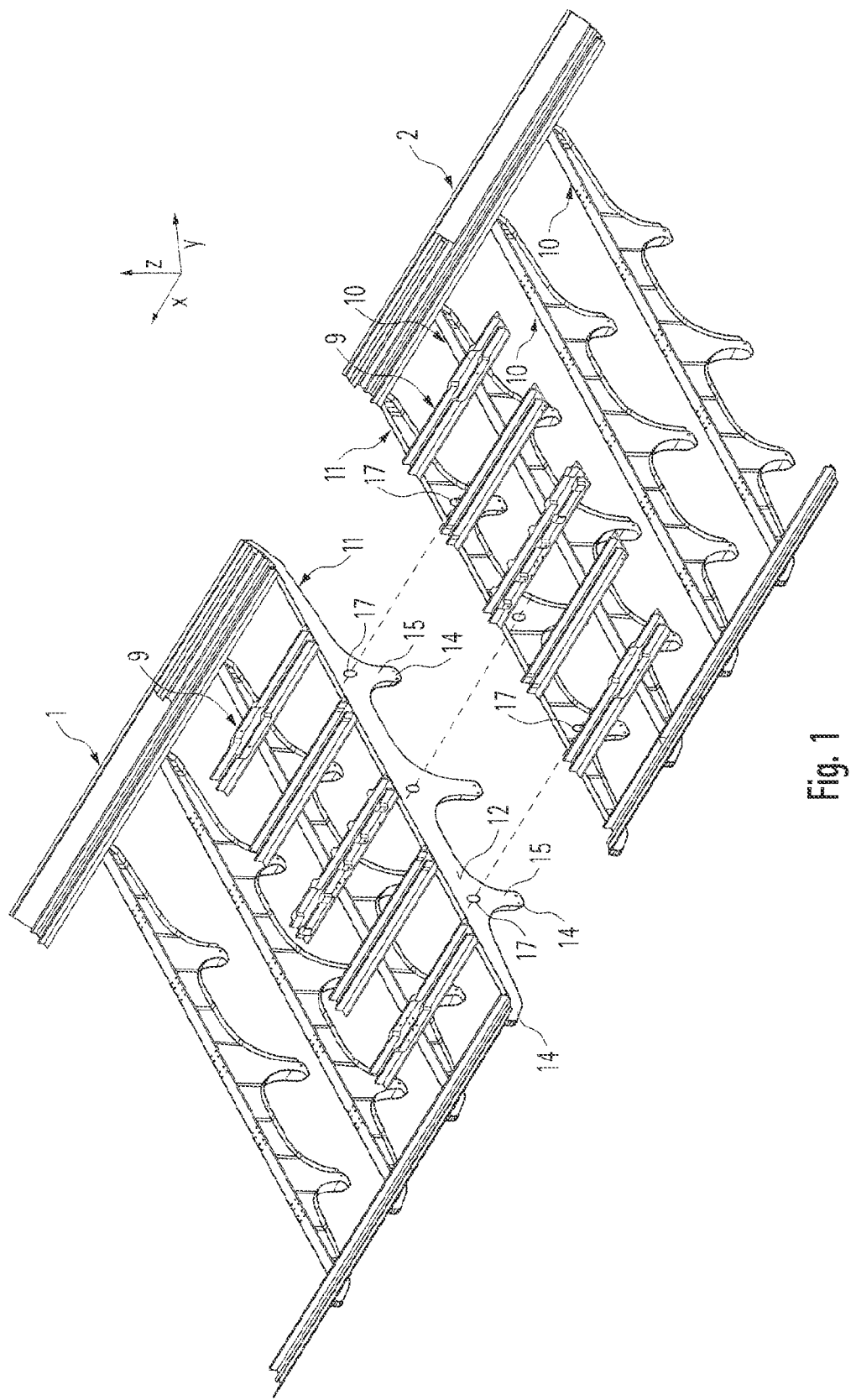

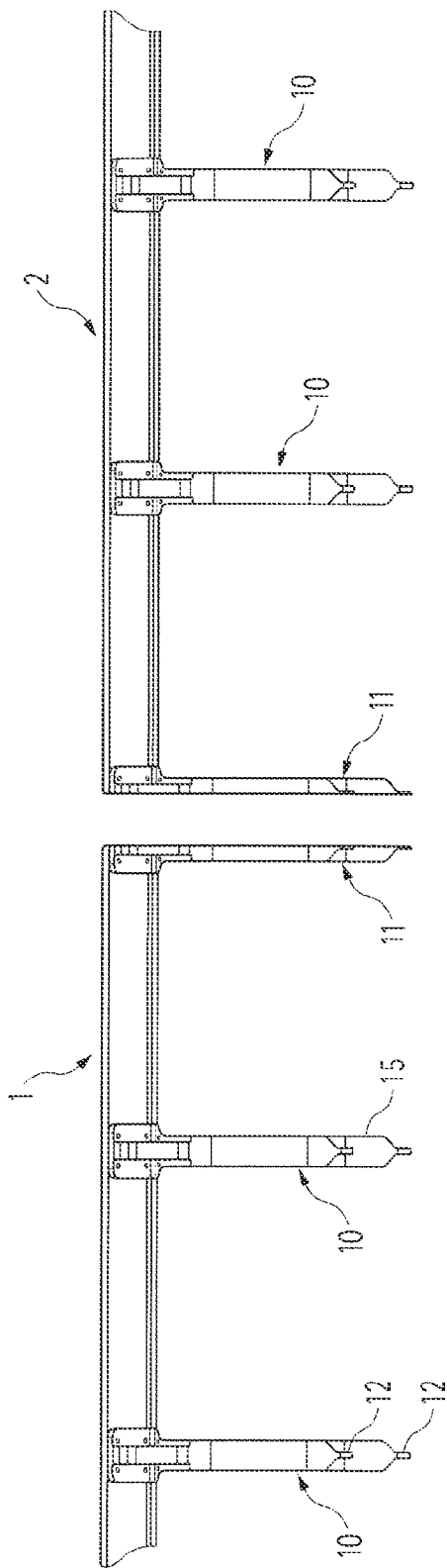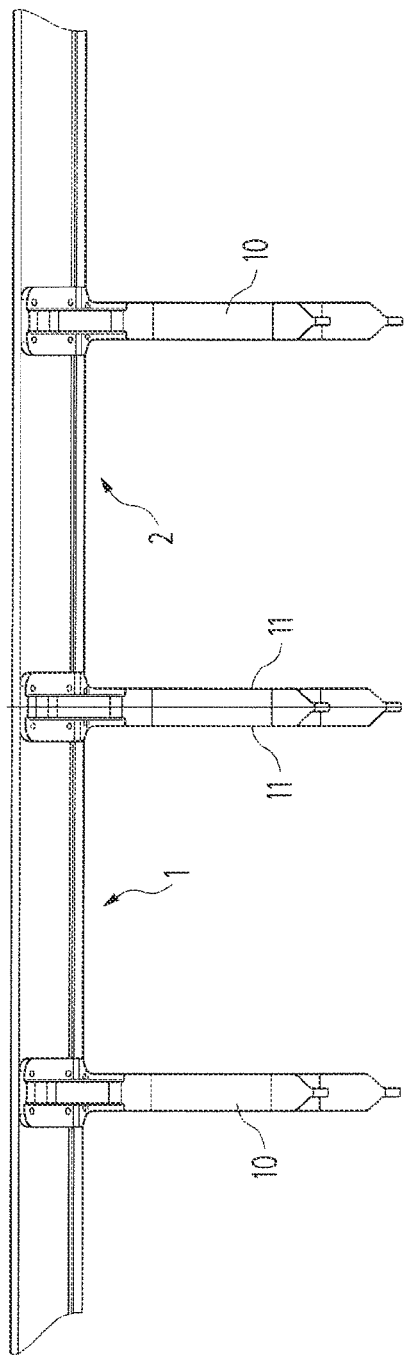

FLOOR MODULE OF A CARGO DECK IN THE HULL OF AN AIRCRAFT

CROSS-REFERENCE TO RELATED APPLICATIONS

This application claims priority to foreign Patent Application No. DE 10 2009 012 429.2, filed on Mar. 10, 2009, the disclosure of which is incorporated herein by reference in its entirety.

FIELD OF THE INVENTION

The present invention relates to a floor module of a cargo deck in a hull of an aircraft.

BACKGROUND OF THE INVENTION

Disclosed in EP 1 646 556 B1 and in EP 1 646 557 B1 is a cargo deck for accommodating cargo in the cargo hold of an aircraft, said deck being constructed of floor modules. The floor modules may be assembled outside the aircraft hull and installed in the aircraft in a largely pre-assembled state. Furthermore, it is possible to remove these floor modules for refitting of an aircraft for a different designated use and to replace them with other floor modules.

These floor modules must demonstrate high stability both considered on their own (during assembly and installation in the aircraft) and also later in the aircraft. Moreover, the floor modules should have the lowest weight possible and should be easy to install and remove.

SUMMARY OF THE INVENTION

Embodiments of the present invention advantageously provide a floor module of the type referred to at the outset to the effect that ease of handling during installation and removal is achievable with low weight.

In one embodiment, a floor module of a cargo deck in a hull of an aircraft with a longitudinal axis (x), a transverse axis (y) and a vertical axis (z), comprises support devices for carrying functional elements, e.g. panels, roller conveyors or ball mats, wherein the support devices are attachable to the hull directly or by way of intermediate elements, whereby the floor module, seen in the longitudinal direction (x) of the aircraft, has end support devices with a thickness reduced in such a way compared to the other support devices of the floor module that only together with the end support devices of a floor module installed adjacently in the hull do they ensure a loading capacity that corresponds to at least the loading capacity of the other support devices. This means, therefore, that such end support devices have a reduced loading capacity compared to the support devices installed in the central regions of the floor modules. This not only saves weight but rather the end support devices can also be designed in such a way that they become easier to handle during installation.

The end support devices preferably have complementary end surfaces such that adjacent end support devices are joinable to one another with edge regions or profiles that are flush. In a preferred embodiment, the complementary end surfaces are designed here substantially as smooth surfaces such that two adjacent end support devices lie flat against one another. Alternatively, it is also possible to provide profiles to increase the bending resistance, however these are then pushed together (complementary) in such a way that these profiles lie not against one another but beside one another. This results in increased stability with reduced dimensions of the assembled modules.

A particular increase in the strength of the assembled modules arises if provided on the end support devices are joining devices which join the end support devices of adjacent modules to one another increasing a permissible buckling load and/or bending load. These joining devices should be as easily detachable as possible, may therefore be designed, for example, as threaded bolts or similar.

BRIEF DESCRIPTION OF THE DRAWINGS

A preferred embodiment of the invention is described in greater detail in the following on the basis of drawings.

FIG. 1 is a perspective view of two assembled floor modules that are not yet adjacent to one another.

FIG. 2 depicts the unassembled floor modules of FIG. 1 in a lateral view (in the y direction).

FIG. 3 depicts the floor modules illustrated in FIG. 2 in the assembled state (adjacent to one another).

DETAILED DESCRIPTION

The invention will now be described with reference to the drawing figures, in which like reference numerals refer to like parts throughout.

As shown in FIG. 1 and illustrated yet again in FIGS. 2 and 3, floor modules 1, 2 are provided which have support devices 10, referred to as cross-members, on which are mounted functional elements 9, roller conveyors in the example shown. The panels which are also provided customarily and which complete the cargo deck are not shown to make representation easier.

Moreover, end support devices 11 are provided which look a little different to other support devices 10. All support devices, however, have feet 15 with fastening devices 14 by way of which floor modules 1, 2 may be fastened in the hull of an aircraft. These feet 15 may also be mounted separately on support devices 10, 11 and not be formed integrally with them as shown in the example.

End support devices 11 have complementary surfaces 12 that are designed such that in each case two end support devices 11 of two adjacent floor modules 1, 2 can be brought close to one another. If the complementary surfaces are designed, as shown in the example, as simple, flat surfaces, then two end support devices lying against one another can, as illustrated in FIG. 2, have substantially the same thickness as remaining support devices 10. This method of construction enables particularly easy installation and removal of individual modules 1 or 2 from a cargo deck which is made up of floor modules and which is otherwise already permanently installed in the aircraft.

A further increase in the overall stability of both end support devices 11 and also of the entire cargo deck made up of floor modules may be achieved in that provided in end support devices 11 are joining devices 17 by way of which adjacent end support devices 11 are attached to one another. This results in multi-layer structures with increased resistance buckling and bending.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A floor module of a cargo deck in a hull of an aircraft having a longitudinal axis, a transverse axis and a vertical axis, comprising:
    a plurality of support devices, for carrying functional elements, attachable to the hull directly of by way of intermediate elements; and
    one or more end support devices having a reduced thinness as compared to the support devices, such that only together with the end support devices of a floor module installed adjacently in the hull do the end support devices ensure a loading capacity that corresponds to at least the loading capacity of a support device, each end support device including a complementary end surface that is joinable to a complementary end surface of an end support device of an adjacent floor module with edge regions or profiles of the complementary end surfaces of the adjacent end support devices that are flush, the complementary end surface, from edge region to edge region, of the end support device being adapted to lie flat against the complimentary end surface, from edge region to edge region, of the end support device of the adjacent floor module.

2. The floor module according to claim 1, wherein the end support devices include joining devices which join the end support devices of adjacent modules to one another increasing a permissible buckling load and/or bending load.

3. The floor module according to claim 1, wherein the functional elements include panels, roller conveyors or ball mats.

4. A cargo deck in a hull of an aircraft comprising:
    a first floor module including a plurality of support devices for carrying functional elements attachable to the hull directly or by way of intermediate elements, and one or more first end support devices, each first end support device including a smooth first end surface having an edge region; and
    a second floor module including a plurality of support devices for carrying functional elements attached to the hull directly or by way of intermediate elements, and one or more second end support device, each second end support device having a reduced thickness as compared to the support devices, each second end support device including a smooth second end surface having an edge region, the second floor module being installed adjacent to the first floor module such that the first end surface and edge region of the first end support device of the first floor module lies flat against the second end surface and edge region of the second end support of the second floor module with the edge region of the first end surface of the first end support device being flush with the edge region of the second end surface of the second end support device;
    whereby the adjacent first and second end support devices ensure a loading capacity that corresponds to at least the loading capacity of a support device.

5. The cargo deck of claim 4 wherein the first end support device of the first floor module is joined to the second end support device of the second floor module, with the first end surface of the first end support in engagement with the second end surface of the second end support.

* * * * *